United States Patent
Bhagwat et al.

(10) Patent No.: US 11,036,690 B2
(45) Date of Patent: Jun. 15, 2021

(54) GLOBAL NAMESPACE IN A HETEROGENEOUS STORAGE SYSTEM ENVIRONMENT

(71) Applicant: INTERNATIONAL BUSINESS MACHINES CORPORATION, Armonk, NY (US)

(72) Inventors: Deepavali Bhagwat, Cupertino, CA (US); Nilesh Bhosale, Warje (IN); Joseph Dain, Vail, AZ (US); Dean Hildebrand, Bellingham, WA (US); Wayne Sawdon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 643 days.

(21) Appl. No.: 15/646,284

(22) Filed: Jul. 11, 2017

(65) Prior Publication Data

US 2019/0018844 A1      Jan. 17, 2019

(51) Int. Cl.
| | |
|---|---|
| *G06F 16/22* | (2019.01) |
| *G06F 16/182* | (2019.01) |
| *G06F 16/14* | (2019.01) |
| *H04L 29/06* | (2006.01) |

(52) U.S. Cl.
CPC ......... *G06F 16/1827* (2019.01); *G06F 16/14* (2019.01); *G06F 16/22* (2019.01); *H04L 69/00* (2013.01)

(58) Field of Classification Search
CPC ....... G06F 16/1827; G06F 16/14; G06F 16/22
See application file for complete search history.

(56) References Cited

U.S. PATENT DOCUMENTS

| | | | |
|---|---|---|---|
| 8,935,204 B2 | 1/2015 | Peto et al. | |
| 9,081,779 B2 | 7/2015 | Gupta | |
| 9,619,487 B2 | 4/2017 | Bane et al. | |
| 2005/0234875 A1* | 10/2005 | Auerbach | G06F 16/951 |
| 2006/0026193 A1 | 2/2006 | Hood | |
| 2010/0057692 A1 | 3/2010 | Yoon et al. | |
| 2010/0088317 A1* | 4/2010 | Bone | G06F 16/1734 |
| | | | 707/737 |
| 2010/0332401 A1 | 12/2010 | Prahlad et al. | |
| 2014/0181063 A1 | 6/2014 | Pidduck | |
| 2014/0310278 A1 | 10/2014 | D'Amato et al. | |

(Continued)

FOREIGN PATENT DOCUMENTS

| | | |
|---|---|---|
| KR | 1020090021932 A | 3/2009 |
| WO | 2015088483 A1 | 6/2015 |

OTHER PUBLICATIONS

Anonymous, "Method for Notification Events classification based on Tags," an IP.com Prior Art Database Technical Disclosure, IP.com No. IPCOM000206918D, May 13, 2011 (8 pages).

(Continued)

*Primary Examiner* — Grace Park
(74) *Attorney, Agent, or Firm* — Griffiths & Seaton PLLC

(57) ABSTRACT

Embodiments for namespace management between storage systems by a processor. Events, containing metadata associated with an operation, from a plurality of heterogeneous storage systems may be received such that the events are indexed into a common repository according to the metadata to maintain a single namespace for data in the plurality of heterogeneous storage systems.

21 Claims, 7 Drawing Sheets

(56) References Cited

U.S. PATENT DOCUMENTS

| | | | |
|---|---|---|---|
| 2015/0205834 A1* | 7/2015 | Keeton | G06F 16/14 |
| | | | 707/714 |
| 2016/0313934 A1 | 10/2016 | Isherwood et al. | |
| 2016/0314163 A1 | 10/2016 | Marquardt et al. | |
| 2017/0006135 A1 | 1/2017 | Siebel et al. | |
| 2017/0085447 A1 | 3/2017 | Chen et al. | |
| 2017/0161288 A1 | 6/2017 | Feldman et al. | |
| 2018/0314751 A1 | 11/2018 | Filippi et al. | |
| 2018/0365627 A1 | 12/2018 | Mansour et al. | |
| 2019/0163821 A1* | 5/2019 | Pal | G06F 16/2471 |

OTHER PUBLICATIONS

Anonymous, "A method for integrating additional content-oriented metadata into file system data structures to improve user access," an IP.com Prior Art Database Technical Disclosure, IP.com No. IPCOM000240079D, Dec. 29, 2014 (3 pages).

Thorat, "Object Storage Analytics: Leveraging Cognitive Computing for Deriving Insights and Relationships," Storage Developer Conference, Santa Clara, 2016 (34 pages).

List of IBM Patents or Patent Applications Treated as Related dated Jul. 12, 2017 (2 pages).

\* cited by examiner

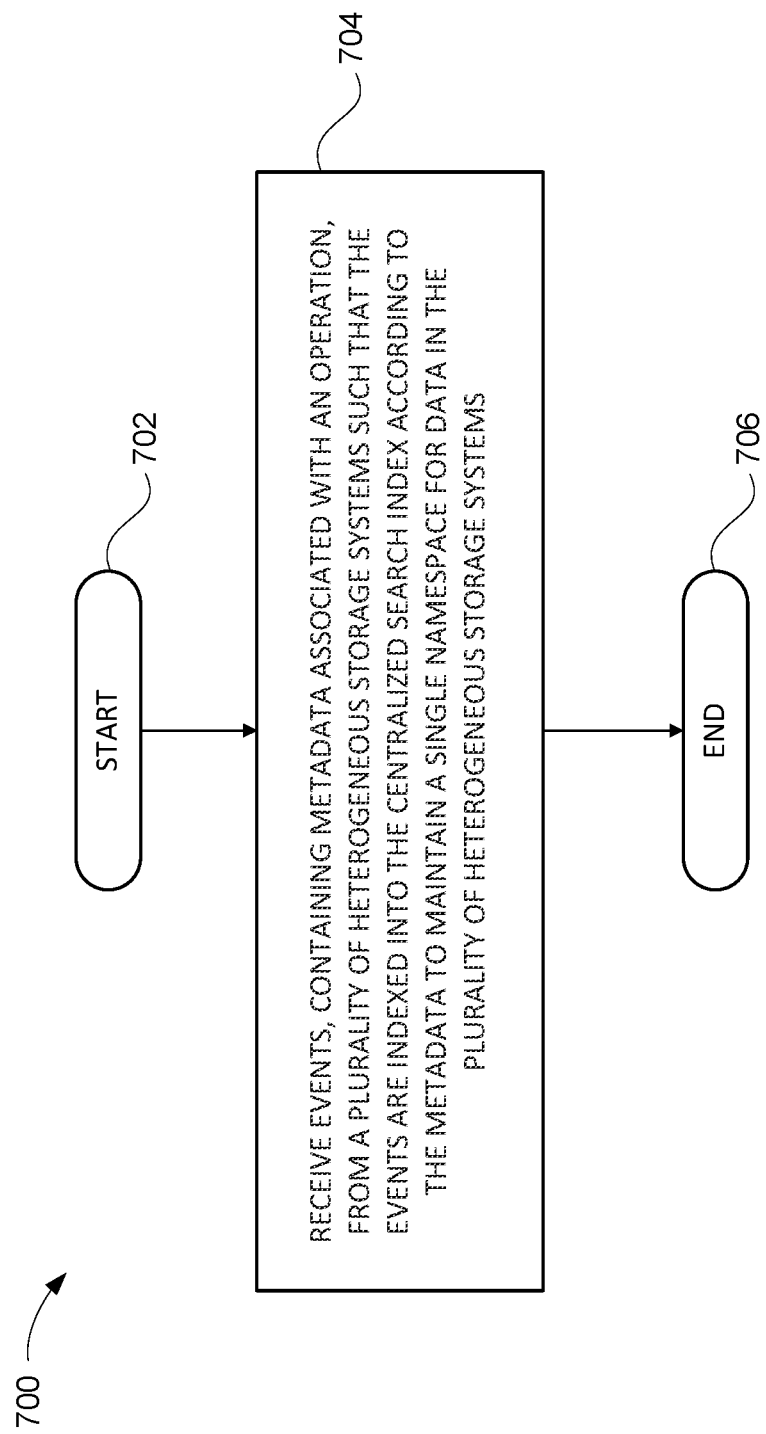

GLOBAL NAMESPACE IN A HETEROGENEOUS STORAGE SYSTEM ENVIRONMENT

CROSS-REFERENCE TO RELATED APPLICATIONS

This Application is related to U.S. application Ser. Nos. 15/646,269 and 15/646,278, each filed on even date as the present Application.

BACKGROUND OF THE INVENTION

Field of the Invention

The present invention relates in general to computing systems, and more particularly to, various embodiments for a storage event pipeline driven global namespace with system and custom metadata in a heterogeneous storage system using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing and storing very large amounts of information is a key problem to solve.

SUMMARY OF THE INVENTION

Various embodiments for using a global namespace between storage systems by a processor are provided. Events, containing metadata associated with an operation, from a plurality of heterogeneous storage systems may be received such that the events may be indexed into a common repository according to the metadata to maintain a single, global namespace for data in the plurality of heterogeneous storage systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a flowchart diagram depicting an exemplary method for using a global namespace between storage systems by a processor, in which aspects of the present invention may be realized.

DETAILED DESCRIPTION OF THE DRAWINGS

Within a computing storage architecture, such as a storage area network (SAN) system or cloud computing system, it is often considered desirable to intelligently distribute data across different types of storage media to improve access performance and reduce storage costs. Such types of storage management systems may perform various data management and storage area management functions, including application management, resource availability management, network management, performance management, service management, systems management, and the like.

The number of files and objects users must manage is growing at exponential rates. Currently, there is no single platform that is enabled to store all the data and, consequently, there is no common method to search for the data. In addition to managing existing data, users may generate terabytes of new data each day such as, for example, service providers using cloud computing may be managing a trillion files in a single system, social media platforms adding billions of audio and video files each day, or the scientific community providing billions of files, and the like. With the generation of large amounts of data, a user is unable to effectively search for the data, creating a "data junkyard".

Figure 4:
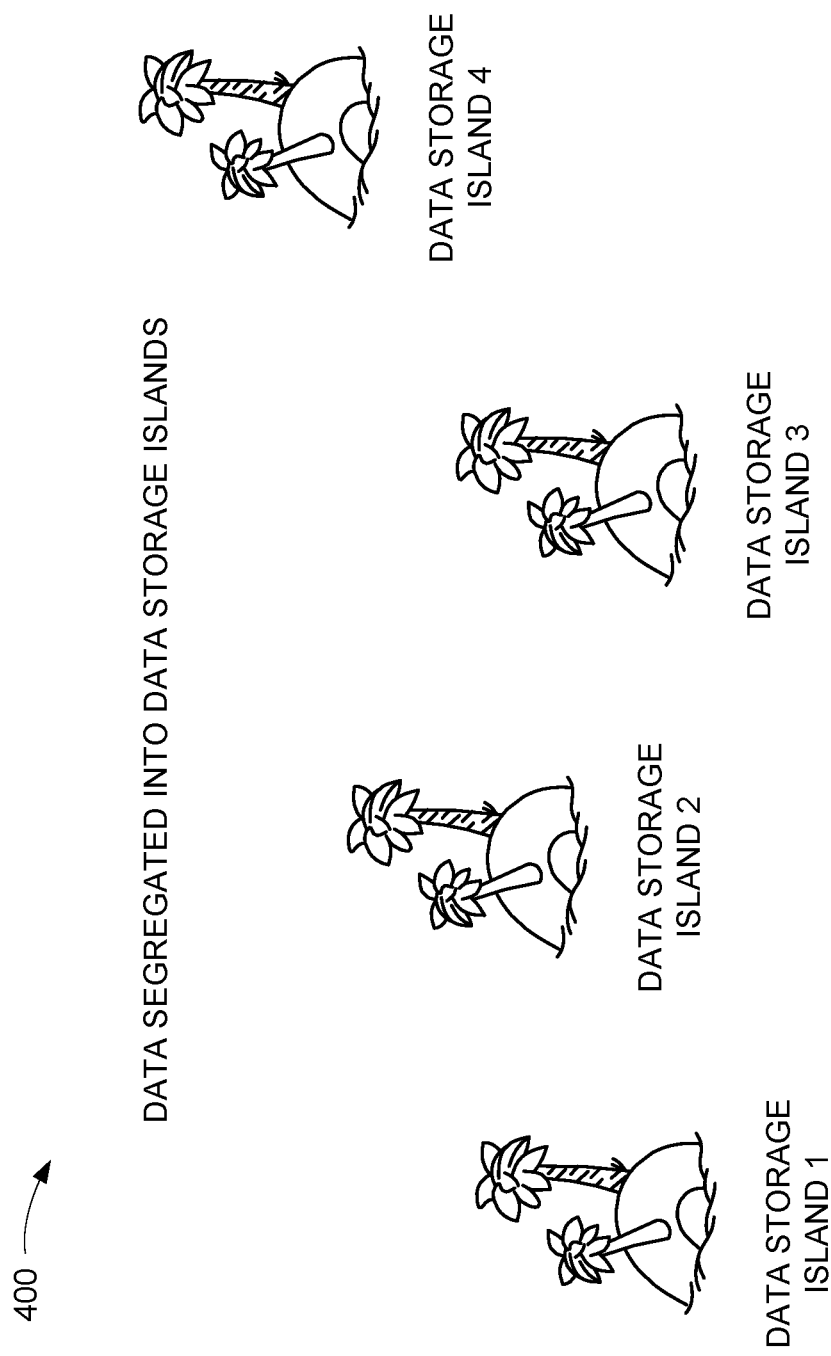
FIG. 4 is an additional block diagram depicting data storage islands according to an embodiment of the present invention.

One way of managing the large amounts of data is by spreading the data across multiple "data storage islands" (or storage subsystems or storage silos) designed to group data according to storage type such as, for example, data storage island 1 (e.g., a blue-ray optical data storage island), data storage island 2 (e.g., a tape drive data storage island), data storage island 3 (e.g., virtual data storage island), and/or data storage island 4 (e.g., a cloud-object data storage island) as illustrated in FIG. 4. However, storage islands require multiple tools, operations, processes, and/or methods that must be used and maintained to search across these data storage islands, creating a challenge for storage management. These tools and methods available today break down at scale due to the number of files and objects that must be managed. In essence, these data storage islands simply take too long to profile and maintain a consistent view of the environment and are too complex to manage. For example, doing a file tree walk or find on a large file system impacts the storage Input/Output ("I/O") and is too slow to work at scale thereby reducing the overall computing efficiency. As used herein, a data storage island may refer to an individual storage subsystem that maintains its own data. For example, storage islands may be multiple instances of shared storage systems. The storage islands may use a single or multiple storage media types. A data storage island may be a storage subsystem or a storage silo.

Accordingly, the present invention builds a real-time single namespace of the data (e.g., files and objects) from multiple data sources (or data storage islands) by capturing events containing system metadata and custom metadata across a plurality of heterogeneous storage systems. The events may be triggered according to one or more operations in the plurality of heterogeneous storage systems. The events may be ordered and normalized to derive common fields in a consistency framework using a centralized search index (or "centralized metadata index").

In an additional aspect, the present invention enables or instructs each of the plurality of heterogeneous storage systems to send events based on user activity or application activity across the heterogeneous storage environment to a centralized metadata infrastructure in order to maintain a single namespace (e.g., storage event pipeline driven global namespace with system and custom metadata) across the different plurality of heterogeneous storage systems/subsystems. In one aspect, the single namespace contains all of the filenames of files that it manages across each of the storage islands or plurality of heterogeneous storage systems.

A knowledge of the data (e.g., files and objects) semantics may be applied in conjunction with ordering the events to ensure the single, global namespace accurately reflects the data (e.g., files and objects) in the environment. Storage pool and sub-pool element mapping of the data may be maintained in the single, global namespace, such as, for example, indexing a tape cartridge or tape cartridges that maintain the single, global namespace.

The normalization operation may include generating common fields across disparate storage island data sources that are searchable via a single query. Additionally, a user may tag the data (e.g., files and objects) with custom metadata aligned to a line of business (e.g., a specific department of a company such as a finance department, human resource department, research department, etc.) in order to provide optimized tracking and searching of the content. Specifically, users and applications may set, modify, and/or remove custom metadata via the data (e.g., files and objects) interfaces of each of the storage islands (e.g., the different plurality of heterogeneous storage systems). The custom metadata, along with the system metadata, may be sent to and/or received by the centralized search index, which normalizes and indexes the custom metadata along with the system metadata. The custom metadata tags may be indexed in a centralized metadata store via live/real-time events from a plurality of heterogeneous storage systems, and using the custom metadata in conjunction with system metadata (e.g., size pool metadata and storage pool metadata), operation type (e.g., read operation, write operation, get operation, put operation, delete operation, etc.), or a combination thereof. Users and applications may access the centralized search index (or "centralized metadata index") to set, modify, and/or remove custom metadata.

In one aspect, the present invention addresses the data junkyard challenge providing several advantages. For example, the present invention provides transparency to users and/or applications in a plurality of heterogeneous storage systems. The plurality of heterogeneous storage systems may be enabled and instrumented to send events to the centralized metadata infrastructure without impact to the applications using one of the plurality of heterogeneous storage systems. Data consistency issues associated with scheduling recurring scans of storage islands is also eliminated. Rather, the present invention minimizes processing overhead by indexing live events and maintaining a real-time view (e.g., instantaneous view) of the data (e.g., files and objects) in the plurality of heterogeneous storage systems environment. The present invention also eliminates the need to use multiple different storage management tools to maintain a view of the files and objects in the environment. The present invention works transparently across files and objects, across multiple sites, and on-premises/off-premises cloud computing systems and also allows users and applications to tag files and objects with custom metadata aligned to a line of business which is normalized and indexed in the centralized metadata infrastructure for advanced searching.

The mechanisms of the illustrated embodiments may leverage an event driven index and search infrastructure called "metaocean" (e.g., the centralized search index or centralized metadata index) across multiple source systems for creating, managing, and/or updating the global namespace. In one aspect, the metaocean may be the common repository, centralized search index, or centralized key-value store. In an additional aspect, events and the metadata tags may be indexed across a heterogeneous storage environment into the centralized key-value store (e.g., the metaocean). In one aspect, the central repository may be a key-value store such as, for example, the centralized key-value store, but may also be a database such as, for example, a DB2 database provided by IBM® and/or a flat file or an extensible markup language (xml) file or any other way of storing information.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
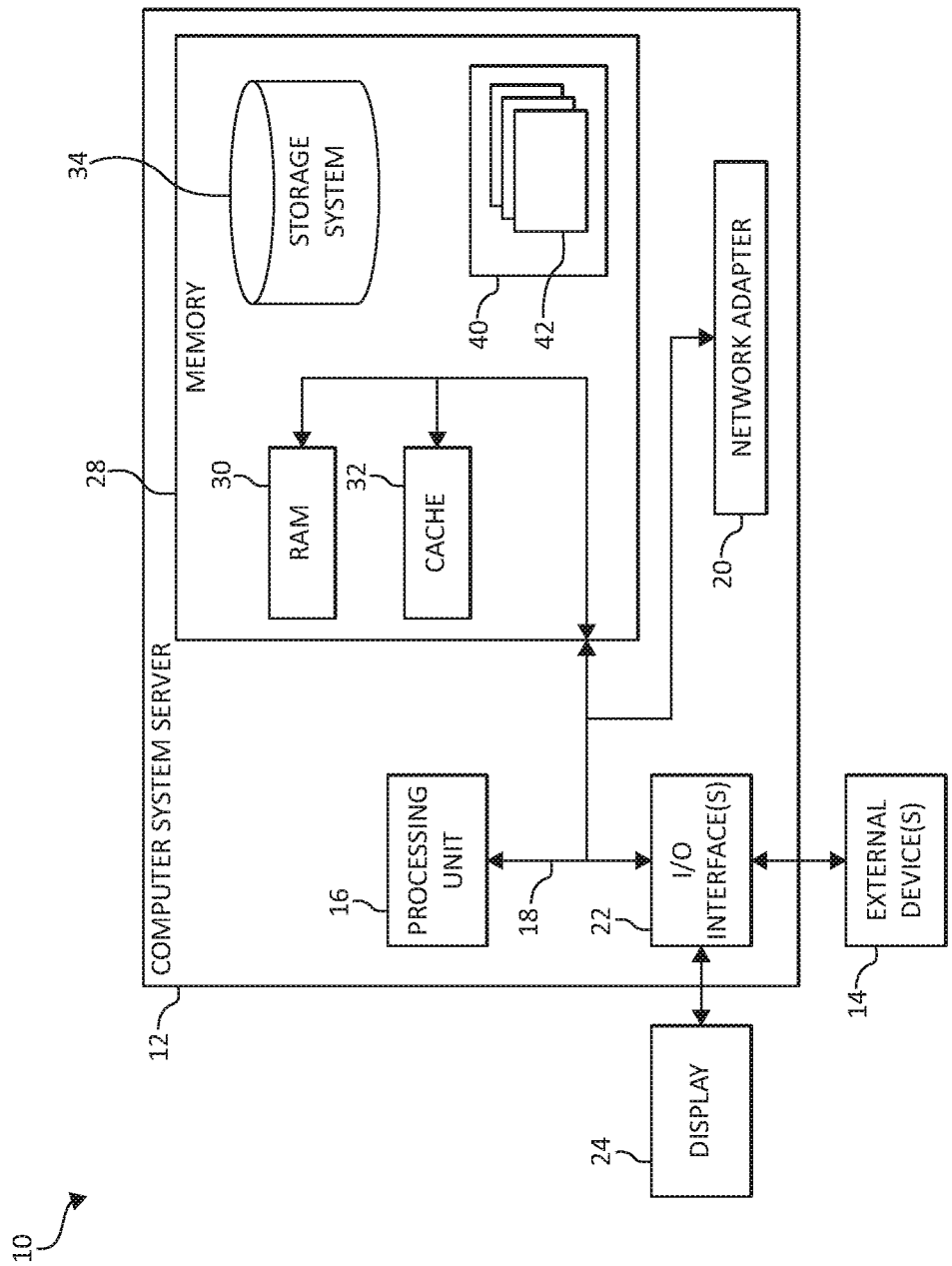
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
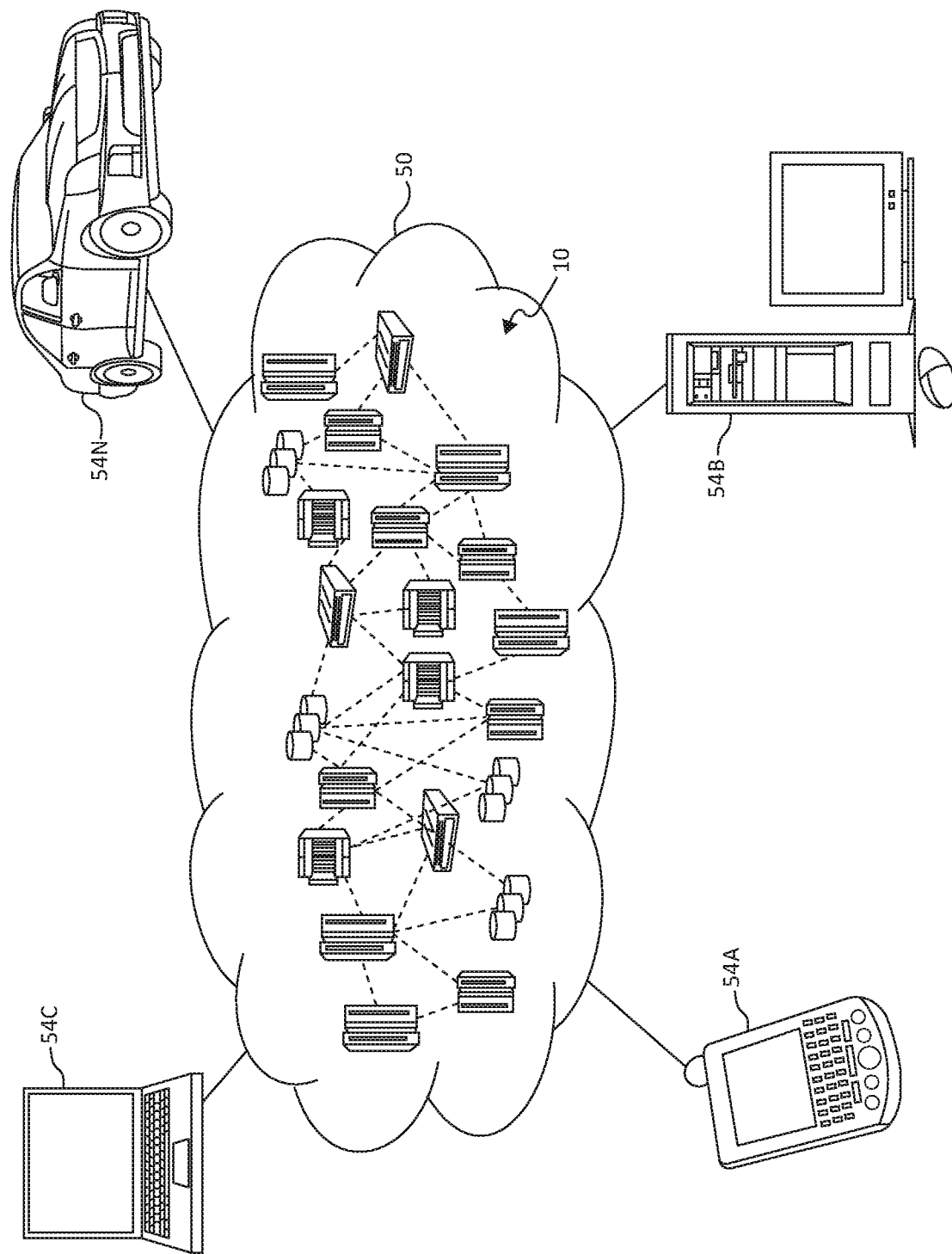
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
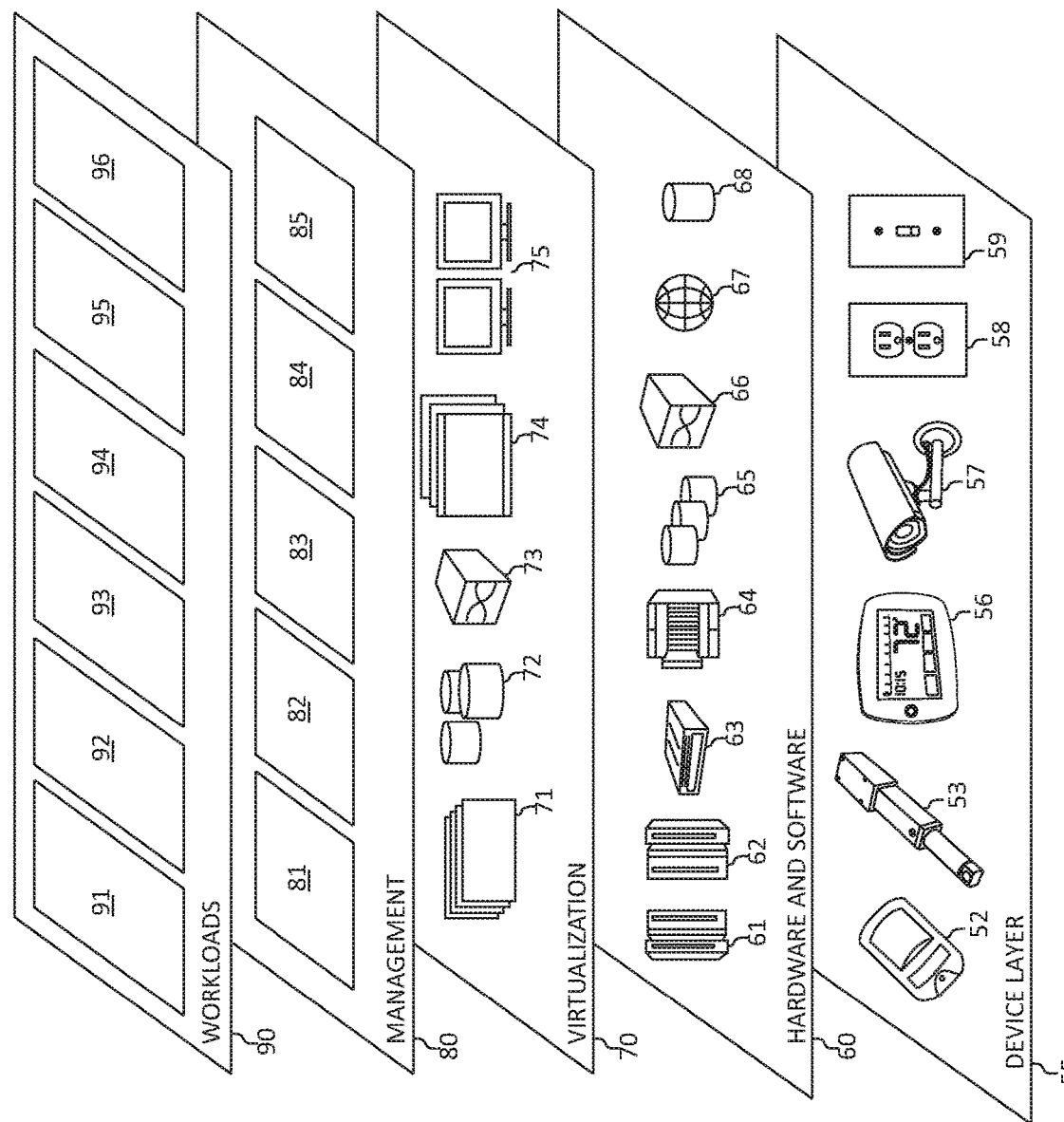
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various storage event pipeline driven global namespace workloads and functions 96. In addition, storage event pipeline driven global namespace workloads and functions 96 may include such operations as data analysis (including data collection and processing from various environmental sensors), metadata tagging, namespace processing, event and metadata ordering, normalizing, processing, and/or analytics operations. One of ordinary skill in the art will appreciate that the storage event pipeline driven global namespace workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the storage event pipeline driven global namespace workloads. For example, the present invention may leverage a customized, application defined infrastructure tool that may be referred to herein as a metaocean, as illustrated in FIG. 5.

Figure 5:
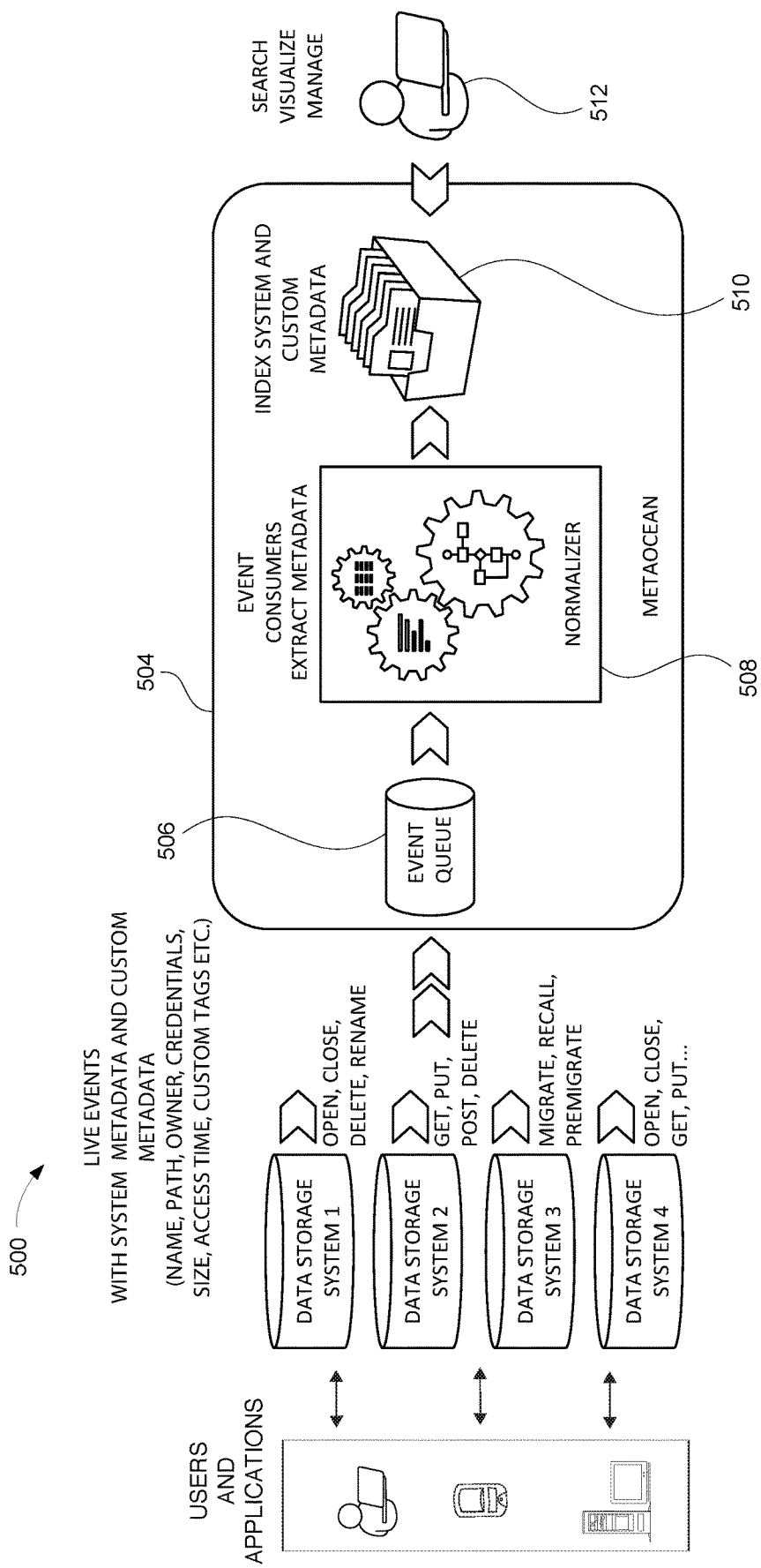
FIG. 5 is an additional block diagram depicting various user hardware and cloud computing components functioning using a centralized search index in accordance with aspects of the present invention.

Turning now to FIG. 5, a block diagram 500 depicting various user hardware and cloud computing components functioning using a centralized event driven index and search infrastructure called "metaocean". The event driven index and search infrastructure may include a queuing application programming interface ("API" or "metaocean queuing API") for receiving one or more events from a plurality of heterogeneous storage systems such as, for example, data storage system 1, data storage system 2, data storage system 3, and/or data storage system 4, each of which may be data storage devices and/or data storage islands.

The event driven index and search infrastructure (e.g., a centralized search index 504) may also include an event queue 506, a normalizer 508, and/or an index 510. The events and content of the events may be placed in the queue of the event driven index and search infrastructure 504. For example, users and/or applications (using data storage system 1) may perform an open, close, delete, or rename operation in the data storage system 1. Users and/or applications (using data storage system 2) may perform a get, put, post, and/or delete operation in the data storage system 2. Users and/or applications (using data storage system 3) may perform a migrate, recall, or pre-migrate operation in the data storage system 3. Users and/or applications (using data storage system 4) may perform an open, close, get, or put operation in the data storage system 4. Each of the operations in the data storage system may trigger an event which may then be sent to the event queue 506.

The event driven index and search infrastructure 504 may also include the normalizer 508 and/or sanitizer (e.g., data purging) and the index 510 for indexing the events or contents of the events containing the metadata (e.g., an index system and custom metadata). The normalizer 508 (e.g., a metadata normalizer) may also remove the events from the queue 506 and extract system and optionally custom metadata from the events. For example, the event driven index and search infrastructure 504 may extract or capture metadata received from multiple heterogeneous sources such as, for example, data storage system 1, data storage system 2, and/or data storage system 3, and index the content. One or more users may query the set of information in order to perform data analytics and select a course of action (e.g., data migration strategy) based on the mined data.

The custom metadata tags may be indexed in the centralized search index 504 (which may be referred to herein as the event driven index and search infrastructure, a centralized metadata store, a metaocean) via live/real-time events from a plurality of heterogeneous storage systems. The custom metadata may be used in conjunction with system metadata.

Thus, the centralized search index 504 enables users or applications to search 512 the centralized search index to visualize and manage the data in the plurality of heterogeneous storage systems. The centralized search index 504 may also be searched and the search results may be provided to a graphical user interface (GUI) of a computing device or dashboard of the device.

Figure 6:
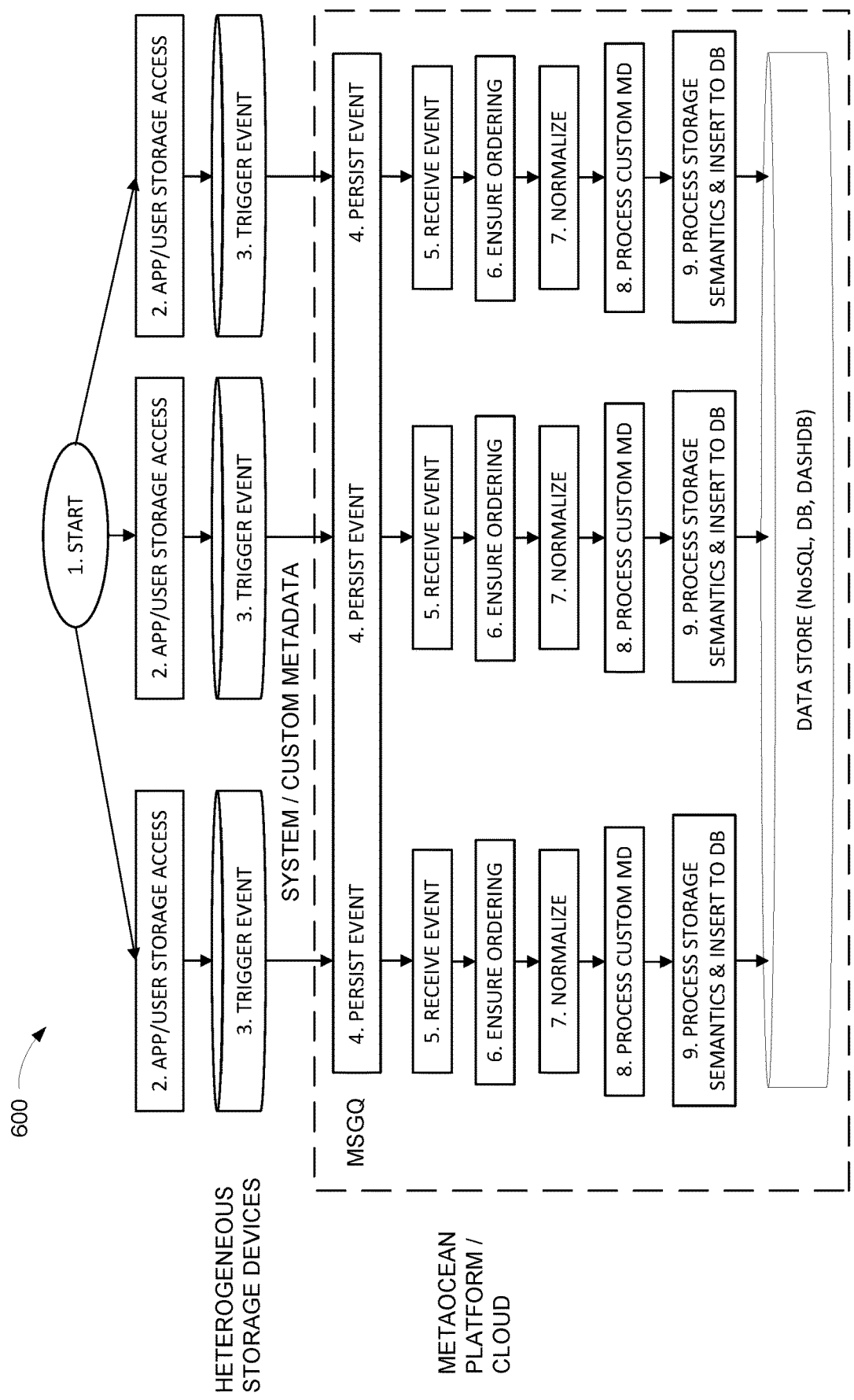
FIG. 6 is a diagram depicting a heterogeneous storage system event pipeline in which aspects of the present invention may be realized.

With the foregoing functional components 500 in view, FIG. 6 is a flow diagram 600 depicting a heterogeneous storage system event pipeline using a centralized search index. The functionality 600 may be implemented as a method executed as instructions on a machine, where the instructions are included on at least one computer readable medium or on a non-transitory machine-readable storage medium. The functionality 600 may start in step 1. In step 2, an application or user may perform a task on a storage device (e.g., a storage device or "storage island" in a heterogeneous storage system). The storage device can be any file system or object store and can be "on-prem", in a cloud computing environment, or in a hybrid storage configuration. The functionality 600 may then move to step 3. In step 3, the storage device may trigger an event containing both system metadata and custom metadata (which may be optional) associated with an operation relating to the storage device.

The event may be placed into a message queue, as indicated in step 4. In one aspect, the message queue may be a persistent message queue. The event may be received or removed from the queue, as in step 5. Step 6, ensures that the ordering of the event is guaranteed. For example, in one aspect, the ordering of the events may include assigning each file and object a unique key where all unique keys go to the same queue topic in order where they are subsequently pulled in order. The unique key may be separate from the custom metadata. In one aspect, an event queue (e.g., IBM® Kafka®) may be used which has a topic and in that topic there may be numerous partitions. The event queue may be provided/given a key for the event and the event queue may put the event onto a partition according to the key. For example, for data storage system 1, the key may be a cluster name, a file system name, and a file system inode. This way updates to the same file in the same file system always go to the same partition so as to guarantee ordering. Without the guaranteed ordering, a delete operation may be processed out of order which would cause the metaocean to be inconsistent with the actual file system. In an additional aspect, a correlation identifier (ID) or sequence ID may be used to ensure that the order of events is inserted properly into the database.

The functionality 600 may move to step 7. In step 7, one or more fields in the message (which may capture the event such as what happed during the event) may be normalized such that there are common fields inserted into a database (which may be the metaocean platform such as a metaocean cloud storage platform) independent of the source storage system in order to provide a global catalog (e.g., single, global namespace) that may be searched. For example, size, name, storage device, and other fields may each be normalized into common fields. In an additional aspect, an association chain may be established between the different fields.

After normalizing the system fields, custom metadata may be processed and normalized. The processing of the custom metadata may include determining the data type based on predefined key value tags (which may be different than the event queue keys) and inserting the custom metadata as the correct type into the database, as in step 8. In step 9, the database (a database associated with the metaocean platform such as a metaocean cloud storage platform) may be updated based on the type of storage device and operation. For example, a file system close operation, a file system rename operation, a file system pool change, and/or a file system delete operation may be tracked. Upon processing a close event, a new record may be inserted into the database (which provides the single, global namespace). Upon a rename operation, the name of the new path may be updated in the single, global namespace in the database. Upon processing a delete event, the entry in the database associated with a file may be deleted. For a pool change, the system metadata may remain the same, but the target storage pool may be updated in the database. For tape cartridge/data migrations, the system metadata containing the file system, path, and access timestamp may remain the same, but fields in the single, global namespace indicating the disposition of the data such as migrated, pre-migrated, or recalled may be updated in addition to the tape cartridge or tapes where the data resides. For object storage systems, records may be updated for PUT, HEAD, DELETE operations and events received from the object store/storage system may delete the entry from the database. Once the data is in the database from each of the heterogeneous storage devices, the data may be made available for additional data services such as, for example, searching, capacity management, or other data services.

Turning now to FIG. 7, a method 700 for managing a storage system event global namespace with system and custom metadata is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702. One or more events, containing metadata associated with an operation, may be received from a plurality of heterogeneous storage systems such that the events are indexed into the centralized search index according to the metadata to maintain a single namespace for data in the plurality of heterogeneous storage systems, as in block 704. The functionality 700 may end in block 706.

In one aspect, in conjunction with and/or as part of at least one block of FIG. 7, the operations of 700 may include each of the following. The operations 700 may tag data with custom metadata such that the custom metadata enables the data to be tracked and searched. The events containing custom metadata and system metadata may be received into the centralized search index in response to each operation on each one of the plurality of heterogeneous storage systems. System metadata and custom metadata of the events may be captured and content of the metadata may be indexed in the centralized search index.

The operations 700 may also order the events in the centralized search index, and/or normalize the events and the metadata such that the normalizing provides a global catalog of the events in the plurality of heterogeneous storage systems, wherein the global catalog is searchable. The centralized search index may be updated according to operation type of the plurality of heterogeneous storage systems to maintain the single namespace. A mapping of the data may be maintained in the single namespace for the plurality of heterogeneous storage systems. An interactive graphical user interface (GUI) of the centralized search index may be provided to enable a user to view the data in the plurality of heterogeneous storage systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for namespace management between storage systems, comprising:
receiving events, containing metadata associated with an operation, from a plurality of heterogeneous storage systems such that the events are indexed into a centralized search index according to the metadata to maintain a single namespace for data in the plurality of heterogeneous storage systems notwithstanding whether any the plurality of storage systems implement a file system architecture, an object storage architecture, or some combination thereof, wherein the events each comprise a storage action initiated by a user or an application to a respective one of the plurality of heterogeneous storage systems such that, as files or objects of the data are accessed by the user or the application from each of the plurality of heterogeneous storage systems, corresponding file or object identifiers including applicable file names and file paths, and object names and object containers of the files or objects are discerned through the event metadata and indexed into the centralized search index to iteratively build the single namespace for the data as the data is accessed within each of the plurality of heterogeneous storage systems;
tagging the data with custom metadata by the user within the centralized search index such that the custom metadata enables the data to be tracked and searched, wherein the custom metadata is indicative of a particular category of the data or group of an entity with which the data is associated; and
normalizing the events and the metadata including amalgamating the events and the corresponding file or object identifiers from differing storage architectures into the centralized search index such that the normalizing provides a searchable global catalog of the events in the plurality of heterogeneous storage systems, wherein, subsequent to normalizing the events and the metadata, the custom metadata is normalized and processed into the centralized search index by identifying a type of the data to which the custom metadata is tagged based on predefined key value tags associated with the data, and inserting the custom metadata corresponding to the type of the data in a specified field of the centralized search index.

2. The method of claim 1, further including receiving the events containing the custom metadata and system metadata into the centralized search index in response to each operation on each one of the plurality of heterogeneous storage systems.

3. The method of claim 1, further including capturing system metadata and the custom metadata of the events and indexing content of the metadata in the centralized search index.

4. The method of claim 1, further including ordering the events in the centralized search index.

5. The method of claim 1, further including updating the centralized search index according to operation type of the plurality of heterogeneous storage systems to maintain the single namespace.

6. The method of claim 1, further including maintaining a mapping of the data in the single namespace for the plurality of heterogeneous storage systems.

7. The method of claim 1, further including providing an interactive graphical user interface (GUI) of the centralized search index to enable the user to view the data in the plurality of heterogeneous storage systems.

8. A system for namespace management between storage systems, comprising:
one or more computers with executable instructions that when executed cause the system to:
receive events, containing metadata associated with an operation, from a plurality of heterogeneous storage systems such that the events are indexed into a centralized search index according to the metadata to maintain a single namespace for data in the plurality of heterogeneous storage systems notwithstanding whether any the plurality of storage systems implement a file system architecture, an object storage architecture, or some combination thereof, wherein the events each comprise a storage action initiated by a user or an application to a respective one of the plurality of heterogeneous storage systems such that, as files or objects of the data are accessed by the user or the application from each of the plurality of heterogeneous storage systems, corresponding file or object identifiers including applicable file names and file paths, and object names and object containers of the files or objects are discerned through the event metadata and indexed into the centralized search index to iteratively build the single namespace for the data as the data is accessed within each of the plurality of heterogeneous storage systems;

tag the data with custom metadata by the user within the centralized search index such that the custom metadata enables the data to be tracked and searched, wherein the custom metadata is indicative of a particular category of the data or group of an entity with which the data is associated; and normalize the events and the metadata including amalgamating the events and the corresponding file or object identifiers from differing storage architectures into the centralized search index such that the normalizing provides a searchable global catalog of the events in the plurality of heterogeneous storage systems, wherein, subsequent to normalizing the events and the metadata, the custom metadata is normalized and processed into the centralized search index by identifying a type of the data to which the custom metadata is tagged based on predefined key value tags associated with the data, and inserting the custom metadata corresponding to the type of the data in a specified field of the centralized search index.

9. The system of claim 8, wherein the executable instructions receive the events containing the custom metadata and system metadata into the centralized search index in response to each operation on each one of the plurality of heterogeneous storage systems.

10. The system of claim 8, wherein the executable instructions capture system metadata and the custom metadata of the events and index content of the metadata in the centralized search index.

11. The system of claim 8, wherein the executable instructions order the events in the centralized search index.

12. The system of claim 8, wherein the executable instructions update the centralized search index according to operation type of the plurality of heterogeneous storage systems to maintain the single namespace.

13. The system of claim 8, wherein the executable instructions maintain a mapping of the data in the single namespace for the plurality of heterogeneous storage systems.

14. The system of claim 8, wherein the executable instructions provide an interactive graphical user interface (GUI) of the centralized search index to enable the user to view the data in the plurality of heterogeneous storage systems.

15. A computer program product for namespace management between storage systems by a processor, the computer program product comprising a non-transitory computer-readable storage medium having computer-readable program code portions stored therein, the computer-readable program code portions comprising:

an executable portion that receives events, containing metadata associated with an operation, from a plurality of heterogeneous storage systems such that the events are indexed into a centralized search index according to the metadata to maintain a single namespace for data in the plurality of heterogeneous storage systems notwithstanding whether any the plurality of storage systems implement a file system architecture, an object storage architecture, or some combination thereof, wherein the events each comprise a storage action initiated by a user or an application to a respective one of the plurality of heterogeneous storage systems such that, as files or objects of the data are accessed by the user or the application from each of the plurality of heterogeneous storage systems, corresponding file or object identifiers including applicable file names and file paths, and object names and object containers of the files or objects are discerned through the event metadata and indexed into the centralized search index to iteratively build the single namespace for the data as the data is accessed within each of the plurality of heterogeneous storage systems;

an executable portion that tags the data with custom metadata by the user within the centralized search index such that the custom metadata enables the data to be tracked and searched, wherein the custom metadata is indicative of a particular category of the data or group of an entity with which the data is associated; and an executable portion that normalizes the events and the metadata including amalgamating the events and the corresponding file or object identifiers from differing storage architectures into the centralized search index such that the normalizing provides a searchable global catalog of the events in the plurality of heterogeneous storage systems, wherein, subsequent to normalizing the events and the metadata, the custom metadata is normalized and processed into the centralized search index by identifying a type of the data to which the custom metadata is tagged based on predefined key value tags associated with the data, and inserting the custom metadata corresponding to the type of the data in a specified field of the centralized search index.

16. The computer program product of claim 15, further including an executable portion that receives the events containing the custom metadata and system metadata into the centralized search index in response to each operation on each one of the plurality of heterogeneous storage systems.

17. The computer program product of claim 15, further including an executable portion that captures system metadata and the custom metadata of the events and indexes content of the metadata in the centralized search index.

18. The computer program product of claim 15, further including an executable portion that orders the events in the centralized search index.

19. The computer program product of claim 15, further including an executable portion that updates the centralized search index according to operation type of the plurality of heterogeneous storage systems to maintain the single namespace.

20. The computer program product of claim 15, further including an executable portion that maintains a mapping of the data in the single namespace for the plurality of heterogeneous storage systems.

21. The computer program product of claim 15, further including an executable portion that provides an interactive graphical user interface (GUI) of the centralized search index to enable the user to view the data in the plurality of heterogeneous storage systems.

* * * * *